United States Patent
Xie

(10) Patent No.: US 10,120,240 B2
(45) Date of Patent: Nov. 6, 2018

(54) RUBBING ALIGNMENT METHOD OF ALIGNMENT LAYER

(71) Applicant: Wuhan China Star Optoelectronics Technology Co., Ltd., Wuhan (CN)

(72) Inventor: Chang Xie, Wuhan (CN)

(73) Assignee: WUHAN CHINA STAR OPTOELECTONICS TECHNOLOGY CO., LTD., Wuhan, Hubei (CN)

( * ) Notice: Subject to any disclaimer, the term of this patent is extended or adjusted under 35 U.S.C. 154(b) by 83 days.

(21) Appl. No.: 14/763,820

(22) PCT Filed: May 21, 2015

(86) PCT No.: PCT/CN2015/079481
§ 371 (c)(1),
(2) Date: Jul. 27, 2015

(87) PCT Pub. No.: WO2016/161696
PCT Pub. Date: Oct. 13, 2016

(65) Prior Publication Data
US 2016/0306234 A1    Oct. 20, 2016

(30) Foreign Application Priority Data
Apr. 7, 2015 (CN) .......................... 2015 1 0160160

(51) Int. Cl.
*G02F 1/1337* (2006.01)
(52) U.S. Cl.
CPC .. *G02F 1/133784* (2013.01); *G02F 1/133723* (2013.01)
(58) Field of Classification Search
CPC ...................... G02F 1/133784; G02F 1/133723
(Continued)

(56) References Cited

U.S. PATENT DOCUMENTS 5,172,255 A * 12/1992 Brosig .............. G02F 1/133784
349/126
6,154,266 A * 11/2000 Okamoto .......... G02F 1/134363
349/129

(Continued)

FOREIGN PATENT DOCUMENTS

JP         2001166310 A  *  6/2001

OTHER PUBLICATIONS

JP 2001163310 machine translation.*

*Primary Examiner* — Michael P Wieczorek
*Assistant Examiner* — Michael G Miller
(74) *Attorney, Agent, or Firm* — Leong C. Lei

(57) ABSTRACT

The present invention provides a rubbing alignment method of an alignment layer, comprising steps of: step 1, providing a substrate (10), and coating an alignment layer (4) on the substrate (10); step 2, providing a rubbing roller (5), and employing the rubbing roller (5) to implement a first rubbing alignment to the alignment layer (4) according to a first rubbing direction; step 3, employing the rubbing roller (5) to implement a second rubbing alignment to the alignment layer (4) according to a second rubbing direction, and the second rubbing direction is opposite to the first rubbing direction. The rubbing alignment method of the alignment layer can effectively eliminate the rubbing shadow to prevent the uneven rubbing alignment and the liquid crystal alignment disorientation to make the liquid crystals in an orderly arrangement. Thus, the light leakage phenomenon of the liquid crystal display panel in the dark state can be suppressed and the contrast ratio can be raised.

11 Claims, 3 Drawing Sheets

(58) Field of Classification Search
USPC .................................................. 427/162–169
See application file for complete search history.

(56) References Cited

U.S. PATENT DOCUMENTS

| 2002/0131000 | A1* | 9/2002 | Koike | G02F 1/133784 |
| | | | | 349/126 |
| 2008/0158487 | A1* | 7/2008 | Kim | C08F 220/00 |
| | | | | 349/106 |
| 2008/0186435 | A1* | 8/2008 | Son | G02F 1/133514 |
| | | | | 349/106 |
| 2011/0292332 | A1* | 12/2011 | Yang | G02F 1/133784 |
| | | | | 349/187 |

\* cited by examiner

RUBBING ALIGNMENT METHOD OF ALIGNMENT LAYER

FIELD OF THE INVENTION

The present invention relates to a liquid crystal display process field, and more particularly to a rubbing alignment method of an alignment layer.

BACKGROUND OF THE INVENTION

The Liquid Crystal Display (LCD) possesses advantages of thin body, power saving and no radiation to be widely used in many application scope. It has been widely utilized in, such as mobile phones, PDAs (personal digital assistance), digital cameras, laptop screens or notebook screens.

Most of the liquid crystal displays on the present market are back light type liquid crystal displays, which comprise a shell, a liquid crystal display panel located in the shell and a backlight module located in the shell.

Generally, the structure of the LCD panel mainly comprises a Color Filter (CF), a Thin Film Transistor Array Substrate (TFT Array Substrate) and a Liquid Crystal Layer filled inbetween. The working principle is that the light of backlight module is reflected to generate images by applying driving voltages to the two glass substrate for controlling the rotations of the liquid crystal molecules.

For aligning the liquid crystal molecules more regular, an over coat layer with alignment process are respectively provided to the sides of the CF substrate and the TFT substrate close to the Liquid Crystal Layer. The acting force between the branched groups in the alignment layer after process and the liquid crystal molecules is stronger and the anchoring function is provided to the liquid crystal molecules to align the liquid crystal molecules tilting relative to the surface of the alignment layer with a polar angle. The polar angle is the pre-tilted angle of the liquid crystal molecules. The pre-tilted angle can control the alignment of the liquid crystal molecules to prevent the appearance of anti-dumping domains and thus, to optimize the display effect. In the manufacture process of the liquid crystal display panel, the alignment process to the alignment layer is an important process to realize that the liquid crystal molecules to be aligned according to the specific direction and angle by the alignment process. Mainly, rubbing is the main means of the alignment method of the alignment layer according to prior art.

The traditional liquid crystal display panel comprises a plurality of pixels alignment in array, and each pixel comprises a red (R), a green (G), a blue (B), three sub pixels. The R, G, B color resists utilized in prior art are all absorption type color resists. When the light is incoming, only the light of corresponding color can permeate, the lights of other two colors are both absorbed, which make the transmission of the display panel is lower. Therefore, the display technology of forming red, green, blue, white, four sub pixels in one pixel appears. No color resist is added to the W sub pixel to allow more backlight to permeate. Accordingly, the transmission and the brightness of the liquid crystal display panel can be promoted.

The benefit of the RGBW is to promote the usage ratio of the backlight to save the power consumption and lower the cost. The higher brightness level can be achieved under the condition that resolution is not decreased and the power consumption is increased. However, as shown in FIG. 1, at the side of the CF substrate 100 of the liquid crystal display panel, the RGB sub pixels will use the color resists of the same thickness and W sub pixel does not have the color resist. Thus, after coating an alignment layer 120 on the respective pixels and a black matrix 110 overall, the portion of the alignment layer 120 correspondingly covering the W sub pixel appears a sunk area, and the sunk area makes the surface of the alignment layer 120 uneven. As the single rubbing according to prior art is employed to implement the rubbing alignment process to the alignment layer 120, the dead corners where the rubbing roller 300 cannot rub generates at the backside of the sunk area along the rubbing direction, and thus rubbing shadow 130 exists. Namely, the rubbing alignment process is not implemented to the area corresponding to the rubbing shadow 130. Consequently, the liquid crystal alignment in the rubbing shadow 130 is disorientated. Thus, the light leakage issue of the liquid crystal display panel in the dark state occurs and the contrast ratio of the liquid crystal display panel is degraded.

SUMMARY OF THE INVENTION

An objective of the present invention is to provide a rubbing alignment method of an alignment layer, which can effectively eliminate the rubbing shadow to prevent the uneven rubbing alignment and the liquid crystal alignment disorientation to make the liquid crystals in an orderly arrangement. Thus, the light leakage phenomenon of the liquid crystal display panel in the dark state can be suppressed and the contrast ratio can be raised.

For realizing the aforesaid objectives, the present invention provides a rubbing alignment method of an alignment layer, comprising steps of:

step 1, providing a substrate, and coating an alignment layer on the substrate;

step 2, providing a rubbing roller, and employing the rubbing roller to implement a first rubbing alignment to the alignment layer according to a first rubbing direction;

step 3, employing the rubbing roller to implement a second rubbing alignment to the alignment layer according to a second rubbing direction, and the second rubbing direction is opposite to the first rubbing direction.

The step 3 can eliminate a rubbing shadow generated in the step 2.

The step 2 and the step 3 can be repeated for multiple times.

In the step 2 and the step 3, the center of the rubbing roller is at the same horizontal plane.

The substrate is a CF substrate, and the CF substrate comprises a plurality of pixels alignment in array, and each pixel comprises a red, a green, a blue, a white, four sub pixels; color resists of the same thickness are provided corresponding to the red, the green, the blue sub pixels, and a white area corresponds to the white sub pixel, and a black matrix separates the red, the green, the blue, the white sub pixels; the alignment layer is coated on the red, the green, the blue, the blank sub pixels and the black matrix, and the alignment layer is formed with sunk area above the blank sub pixel.

The rubbing roller comprises a roller body and a rubbing cloth fixed surround the roller body, and the roller body moves the rubbing cloth to implement rubbing alignment to the alignment layer.

Material of the rubbing cloth is fiber.

Material of the rubbing cloth is nylon.

Material of the rubbing cloth is velveteen.

Material of the alignment layer is polyimide.

The present invention further provides a rubbing alignment method of an alignment layer, comprising steps of:

step 1, providing a substrate, and coating an alignment layer on the substrate;

step 2, providing a rubbing roller, and employing the rubbing roller to implement a first rubbing alignment to the alignment layer according to a first rubbing direction;

step 3, employing the rubbing roller to implement a second rubbing alignment to the alignment layer according to a second rubbing direction, and the second rubbing direction is opposite to the first rubbing direction;

wherein the step 3 can eliminate a rubbing shadow generated in the step 2;

wherein the step 2 and the step 3 can be repeated for multiple times;

wherein in the step 2 and the step 3, the center of the rubbing roller is at the same horizontal plane;

wherein the substrate is a CF substrate, and the CF substrate comprises a plurality of pixels alignment in array, and each pixel comprises a red, a green, a blue, a white, four sub pixels; color resists of the same thickness are provided corresponding to the red, the green, the blue sub pixels, and a white area corresponds to the white sub pixel, and a black matrix separates the red, the green, the blue, the white sub pixels;

the alignment layer is coated on the red, the green, the blue, the blank sub pixels and the black matrix, and the alignment layer is formed with sunk area above the blank sub pixel;

wherein the rubbing roller comprises a roller body and a rubbing cloth fixed surround the roller body, and the roller body moves the rubbing cloth to implement rubbing alignment to the alignment layer.

The benefits of the present invention are: the present invention provides a rubbing alignment method of an alignment layer, in which the first rubbing alignment is implemented to the alignment layer according to the first rubbing direction, and then the second rubbing alignment is implemented to the alignment layer according to the second rubbing direction, opposite to the first rubbing direction. The rubbing shadow can be effectively eliminated to prevent the uneven rubbing alignment and the liquid crystal alignment disorientation to make the liquid crystals in an orderly arrangement. Thus, the light leakage phenomenon of the liquid crystal display panel in the dark state can be suppressed and the contrast ratio can be raised.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
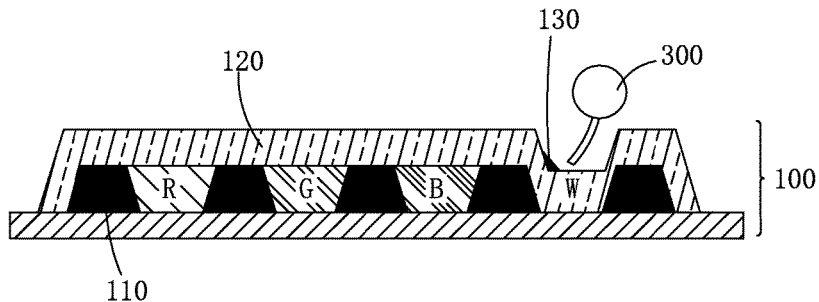
FIG. 1 is a structural diagram of a CF substrate in a liquid crystal display panel according to prior art.
Figure 2:
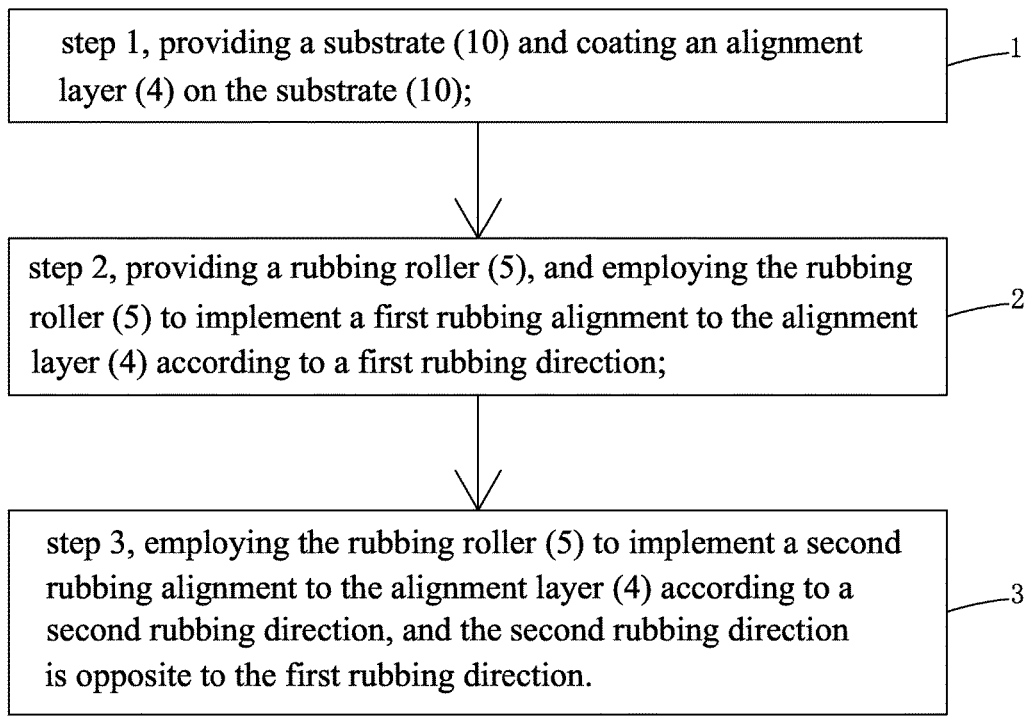
FIG. 2 is a flowchart of a rubbing alignment method of an alignment layer according to the present invention.
Figure 3:
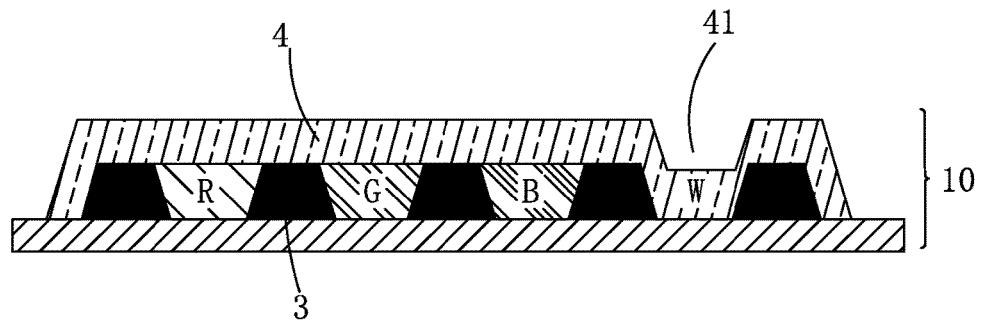
FIG. 3 is a diagram of step 1 of the rubbing alignment method of the alignment layer according to the present invention.

Please refer to FIG. 2. The present invention provides a rubbing alignment method of an alignment layer, comprising steps of:

step 1, as shown in FIG. 3, providing a substrate 10 and coating an alignment layer 4 on the substrate 10.

Specifically, the substrate 10 is a CF substrate, and the CF substrate comprises a plurality of pixels alignment in array, and each pixel comprises a red R, a green G, a blue B, a white W, four sub pixels. Color resists of the same thickness are provided corresponding to the red R, the green G, the blue B sub pixels, and a blank area corresponds to the blank sub pixel W, and a black matrix 3 separates the red R, the green G, the blue B, the blank W sub pixels.

The alignment layer 4 is coated on the red R, the green G, the blue B, the white W sub pixels and the black matrix 3, and the alignment layer 4 is formed with sunk area 41 above the white W sub pixel.

The material of the alignment layer 4 is polyimide (PI).

Figure 4:
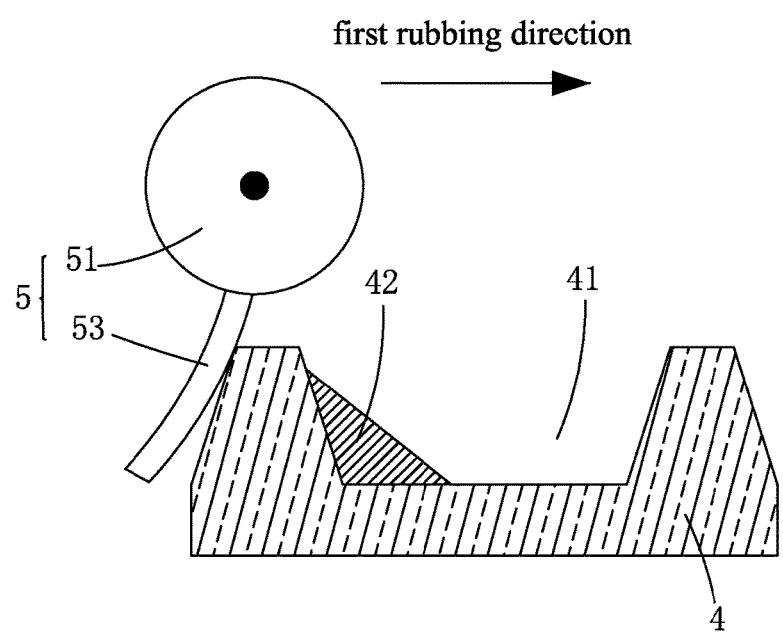
FIG. 4 is a diagram of step 2 of the rubbing alignment method of the alignment layer according to the present invention.

Step 2, as shown in FIG. 4, providing a rubbing roller 5, and employing the rubbing roller 5 to implement a first rubbing alignment to the alignment layer 4 according to a first rubbing direction.

Specifically, the rubbing roller 5 comprises a roller body 51 and a rubbing cloth 53 fixed surround the roller body 51, and the roller body 51 moves the rubbing cloth 53 to implement rubbing alignment to the alignment layer 4.

The material of the rubbing cloth 53 can be fiber, nylon or velveteen.

After the first rubbing alignment, the inside edge in the sunk area 41 along the first rubbing direction exists dead corners that the rubbing roller 5 cannot rub, and rubbing shadow 42 can easily generates. That is to say, the first rubbing alignment is not implemented to the corresponding area of the rubbing shadow 42. The liquid crystal in the rubbing shadow 42 is temporarily in the state of alignment disorientation.

Figure 5:
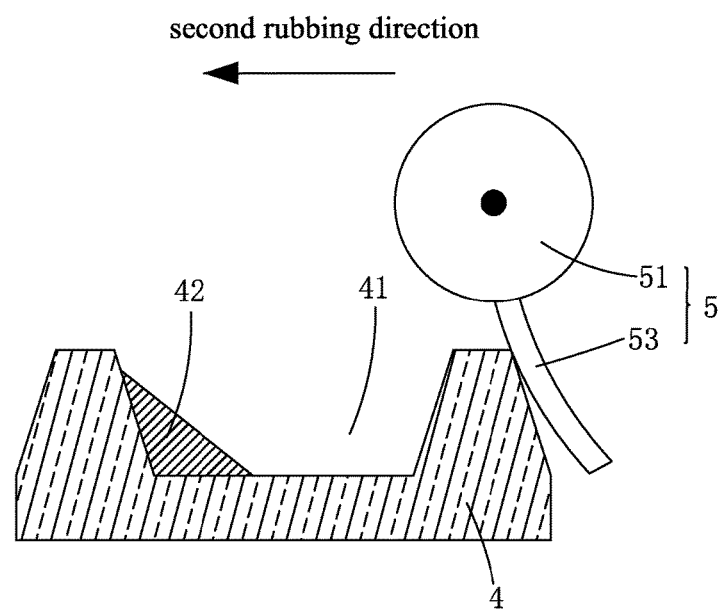
FIG. 5 is a diagram of step 3 of the rubbing alignment method of the alignment layer according to the present invention.

Step 3, as shown in FIG. 5, employing the rubbing roller 5 to implement a second rubbing alignment to the alignment layer 4 according to a second rubbing direction, and the second rubbing direction is opposite to the first rubbing direction, i.e. the included angle between the second rubbing direction and the first rubbing direction is 180°. The rubbing roller 5 can implement rubbing alignment to the corresponding area of the rubbing shadow 42 in the aforesaid step 2 to eliminate the dead corners left in the step 2.

Figure 6:
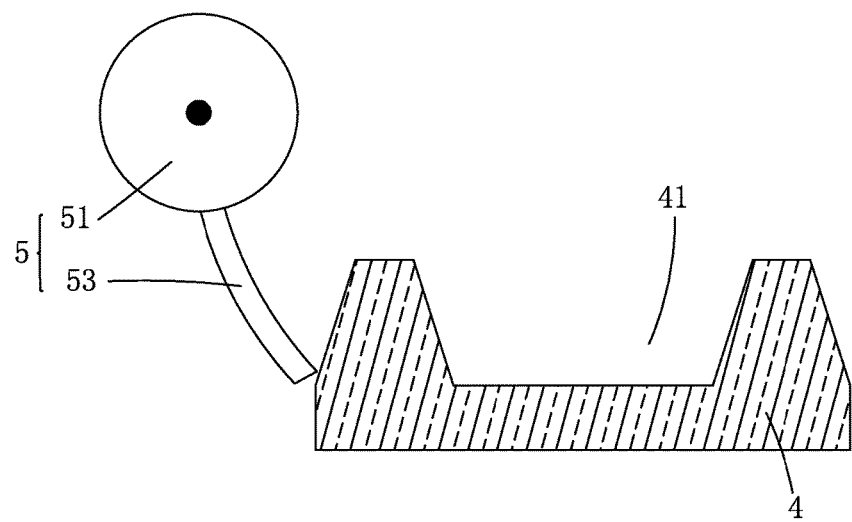
FIG. 6 is a diagram when the rubbing alignment of the rubbing alignment method of the alignment layer according to the present invention is accomplished.

Significantly, in the step 3 and the step 2, the center of the rubbing roller 5 is at the same horizontal plane. Therefore, the second rubbing direction and the first rubbing direction are also at the same horizontal plane but merely the opposite directions and do not affect the alignment angle of the alignment layer 4. As shown in FIG. 6, after accomplishing the second rubbing alignment in the step 3, the rubbing shadow 42 can be effectively eliminated to prevent the uneven rubbing alignment and the liquid crystal alignment disorientation left in the dead corners in the aforesaid step 2 to make the liquid crystals in an orderly arrangement. Thus, the light leakage phenomenon of the liquid crystal display panel in the dark state can be suppressed and the contrast ratio can be raised.

Certainly, the step 2 and the step 3 can be repeated for multiple times according to practical production demands.

In conclusion, in the rubbing alignment method of the alignment layer according to the present invention, the first rubbing alignment is implemented to the alignment layer according to the first rubbing direction, and then the second rubbing alignment is implemented to the alignment layer according to the second rubbing direction, opposite to the first rubbing direction. The rubbing shadow can be effectively eliminated to prevent the uneven rubbing alignment and the liquid crystal alignment disorientation to make the liquid crystals in an orderly arrangement. Thus, the light leakage phenomenon of the liquid crystal display panel in the dark state can be suppressed and the contrast ratio can be raised.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A rubbing alignment method of an alignment layer, comprising steps of:
    step 1, providing a substrate, and coating an alignment layer on the substrate such that the alignment layer has a surface that is partly recessed to form a sunk area that has a bottom and opposite first and second sidewalls extending between the surface of the alignment layer and the bottom and facing each other, the first and second sidewalls respectively defining first and second corner with respect to the bottom;
    step 2, providing a rubbing roller, and employing the rubbing roller to implement a first rubbing alignment to the alignment layer through first movement with respect to the substrate in a first rubbing direction in which the first movement of the rubbing roller is made toward the first sidewall of the sunk area of the alignment film so that the first corner is rubbed; and
    step 3, employing the rubbing roller to implement a second rubbing alignment to the alignment layer through second movement in a second rubbing direction, wherein the second rubbing direction is opposite to the first rubbing direction, wherein the second movement of the rubbing roller in the second direction is made toward the second sidewall of the sunk area of alignment film so that the second corner is rubbed;
    wherein the first and second movements are conducted successively and in opposite first and second rubbing directions and the rubbing roller is arranged such that a center of the rubbing roller is located on the same horizontal plane and is kept at a constant distance from the alignment layer during the successively conducted first and second movements;
    wherein the first and second movements of the rubbing roller make the first and second corners of first and second sidewalls of the alignment layer rubbed so as to have the sunk area of the alignment layer completely rubbed;
    wherein the substrate is a color filter (CF) substrate, and the CF substrate comprises a plurality of pixels arranged in an array, and each pixel comprises a red, a green, a blue, and a white sub pixels; color resists of the same thickness are provided corresponding to the red, the green, the blue sub pixels, and a blank area corresponds to the white sub pixel, and a black matrix separates the red, the green, the blue, the white sub pixels;
    wherein the alignment layer is coated on the red, the green, and the blue sub pixels, the blank area of the white sub pixel and the black matrix, such that a part of the alignment layer corresponding to the blank area is recessed and is formed with the sunk area that is located above the blank area of the white sub pixel.

2. The rubbing alignment method of the alignment layer according to claim 1, wherein step 3 is implemented to eliminate a rubbing shadow generated in step 2.

3. The rubbing alignment method of the alignment layer according to claim 1, wherein step 2 and step 3 are repeated for multiple times.

4. The rubbing alignment method of the alignment layer according to claim 1, wherein the rubbing roller comprises a roller body and a rubbing cloth fixed around the roller body, and the roller body moves the rubbing cloth to implement rubbing alignment to the alignment layer.

5. The rubbing alignment method of the alignment layer according to claim 4, wherein a material of the rubbing cloth is nylon.

6. The rubbing alignment method of the alignment layer according to claim 4, wherein a material of the rubbing cloth is velveteen.

7. The rubbing alignment method of the alignment layer according to claim 1, wherein a material of the alignment layer is polyimide.

8. A rubbing alignment method of an alignment layer, comprising steps of:
    step 1, providing a substrate, and coating an alignment layer on the substrate such that the alignment layer has a surface that is partly recessed to form a sunk area that has a bottom and opposite first and second sidewalls extending between the surface of the alignment layer and the bottom and facing each other, the first and second sidewalls respectively defining first and second corner with respect to the bottom;
    step 2, providing a rubbing roller, and employing the rubbing roller to implement a first rubbing alignment to the alignment layer through first movement with respect to the substrate in a first rubbing direction in which the first movement of the rubbing roller is made toward the first sidewall of the sunk area of the alignment film so that the first corner is rubbed; and
    step 3, employing the rubbing roller to implement a second rubbing alignment to the alignment layer through second movement in a second rubbing direction, wherein the second rubbing direction is opposite to the first rubbing direction, wherein the second movement of the rubbing roller in the second direction is made toward the second sidewall of the sunk area of alignment film so that the second corner is rubbed;
    wherein the first and second movements are conducted successively and in opposite first and second rubbing directions and the rubbing roller is arranged such that a center of the rubbing roller is located on the same horizontal plane and is kept at a constant distance from the alignment layer during the successively conducted first and second movements;

wherein step 3 is implemented to eliminate a rubbing shadow generated in step 2;

wherein step 2 and step 3 are repeated for multiple times;

wherein the substrate is a color filter (CF) substrate, and the CF substrate comprises a plurality of pixels arranged in an array, and each pixel comprises a red, a green, a blue, and a white sub pixels; color resists of the same thickness are provided corresponding to the red, the green, the blue sub pixels, and a blank area corresponds to the white sub pixel, and a black matrix separates the red, the green, the blue, the white sub pixels;

wherein the alignment layer is coated on the red, the green, and the blue sub pixels, the blank area of the white sub pixel and the black matrix, such that a part of the alignment layer corresponding to the blank area is recessed and is formed with the sunk area that is located above the blank area of the white sub pixel; and wherein the rubbing roller comprises a roller body and a rubbing cloth fixed around the roller body, and the roller body moves the rubbing cloth to implement rubbing alignment to the alignment layer.

9. The rubbing alignment method of the alignment layer according to claim 8, wherein a material of the rubbing cloth is nylon.

10. The rubbing alignment method of the alignment layer according to claim 8, wherein a material of the rubbing cloth is velveteen.

11. The rubbing alignment method of the alignment layer according to claim 8, wherein a material of the alignment layer is polyimide.

* * * * *